United States Patent
Szczerba et al.

(10) Patent No.: US 11,935,200 B2
(45) Date of Patent: Mar. 19, 2024

(54) SYSTEM AND METHOD FOR DISPLAYING INFRASTRUCTURE INFORMATION ON AN AUGMENTED REALITY DISPLAY

(71) Applicant: GM Global Technology Operations LLC, Detroit, MI (US)

(72) Inventors: Joseph F. Szczerba, Grand Blanc, MI (US); John P. Weiss, Shelby Township, MI (US); Kai-Han Chang, Madison Heights, MI (US); Thomas A. Seder, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 54 days.

(21) Appl. No.: 17/698,249

(22) Filed: Mar. 18, 2022

(65) Prior Publication Data
US 2023/0298277 A1 Sep. 21, 2023

(51) Int. Cl.
*G06T 19/00* (2011.01)
*B60K 35/00* (2006.01)
*G06F 3/01* (2006.01)

(52) U.S. Cl.
CPC .......... *G06T 19/006* (2013.01); *B60K 35/00* (2013.01); *G06F 3/013* (2013.01); *B60K 35/10* (2024.01); *B60K 35/22* (2024.01); *B60K 35/28* (2024.01); *B60K 2360/149* (2024.01); *B60K 2360/177* (2024.01); *B60K 2360/31* (2024.01); *B60K 2360/48* (2024.01)

(58) Field of Classification Search
None
See application file for complete search history.

(56) References Cited

U.S. PATENT DOCUMENTS

| 10,573,063 B2* | 2/2020 | Cho ................... G02B 27/0179 |
| 11,163,157 B1* | 11/2021 | Myhre ................. G09G 3/003 |
| 2012/0120103 A1* | 5/2012 | Border ................ G02B 27/017 345/633 |

(Continued)

OTHER PUBLICATIONS

"Hyperchromatic multifocal 3D display for augmented reality applications", N. Ledentsov Jr, Proc. SPIE 11931, Optical Architectures for Displays and Sensing in Augmented, Virtual, and Mixed Reality (AR, VR, MR) III, 1193104 (Mar. 7, 2022); https://doi.org/10.1117/12.2612340 (Year: 2022).*

(Continued)

*Primary Examiner* — David H Chu
(74) *Attorney, Agent, or Firm* — Vivacqua Crane PLLC (57) ABSTRACT

A method for displaying infrastructure information on a multi-focal plane augmented reality display of a vehicle includes receiving infrastructure data. The infrastructure data includes information about a location of at least one infrastructure along a route of the vehicle. The method further includes receiving vehicle-location data. The vehicle-location data includes information about a location of the vehicle. The method further includes determining a position of the vehicle relative to the location of the least one infrastructure using the infrastructure data and the vehicle-location data. The method further includes transmitting a command signal to the multi-focal plane augmented reality display to display a virtual image showing the infrastructure information of the infrastructure on the multi-focal plane augmented reality display.

12 Claims, 6 Drawing Sheets

(56) References Cited

U.S. PATENT DOCUMENTS

| | | | | |
|---|---|---|---|---|
| 2014/0354688 A1* | 12/2014 | Min | ...................... | G06T 19/006 |
| | | | | 345/633 |
| 2016/0026253 A1* | 1/2016 | Bradski | ................ | H04N 13/128 |
| | | | | 345/8 |
| 2016/0054563 A9* | 2/2016 | Fujimura | ............... | G02B 27/01 |
| | | | | 359/630 |
| 2017/0085847 A1* | 3/2017 | Kurosawa | .......... | G02B 27/0101 |
| 2017/0291543 A1* | 10/2017 | Goldman-Shenhar | ... | B60Q 9/00 |
| 2017/0309049 A1* | 10/2017 | Law | ..................... | H04N 13/156 |
| 2018/0066956 A1* | 3/2018 | Kim | ....................... | G06T 19/006 |
| 2018/0330531 A1* | 11/2018 | Mullins | ................ | G06T 19/006 |
| 2020/0326202 A1* | 10/2020 | Doemling | .............. | G06V 20/56 |
| 2020/0386570 A1* | 12/2020 | Waldman | ........... | G01C 21/3602 |
| 2022/0253203 A1* | 8/2022 | An | ....................... | H04N 23/632 |
| 2022/0383556 A1* | 12/2022 | Choi | ........................ | G06T 7/30 |

OTHER PUBLICATIONS

Halmenstine, Inverse Proportion Definition, ThoughtCo., Aug. 27, 2020, updated Sep. 5, 2018, Dotdash Meredith Publishing, USA., thoughtco.com/definition-of-inverse-proportion-605257.

* cited by examiner

SYSTEM AND METHOD FOR DISPLAYING INFRASTRUCTURE INFORMATION ON AN AUGMENTED REALITY DISPLAY

INTRODUCTION

The present disclosure relates to a system and method for displaying infrastructure information on an augmented reality display.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Some vehicles include displays to provide information to a vehicle user. However, these displays do not necessarily present infrastructure information, such as street information and/or point-of-interests (POIs) information. Providing such infrastructure information may help the vehicle user easily locate such infrastructure while driving. It is therefore desirable to develop a system and a method for displaying infrastructure information on an augmented reality display based on real-time vehicle positioning within the current driving environment.

SUMMARY

The present disclosure describes a system and method that presents street address location and roadway name support to the driver on a multi-focal plane augmented reality display. Based on real-time vehicle positioning within driving environment, the multi-focal plane augmented reality display presents the vehicle user with street addresses on one or both sides of roadway. The present disclosure also describes a system and method that presents POI information to the driver on a multi-focal plane augmented reality display. Based on personal preferences of the vehicle user, the multi-focal plane augmented reality display presents the vehicle user with the location of stores, landmarks, and other POIs along the local driving route.

In an aspect of the present disclosure, a method for displaying infrastructure information on a multi-focal plane augmented reality display of a vehicle includes receiving infrastructure data. The infrastructure data includes information about a location of at least one infrastructure along a route of the vehicle. The method further includes receiving vehicle-location data. The vehicle-location data includes information about a location of the vehicle. The method further includes determining a position of the vehicle relative to the location of the infrastructure using the infrastructure data and the vehicle-location data. The method further includes transmitting a command signal to the multi-focal plane augmented reality display to display a virtual image showing the infrastructure information of the infrastructure on the multi-focal plane augmented reality display. The method described in this paragraph improves vehicle technology by providing infrastructure information to the vehicle user that helps the vehicle user easily locate and identify infrastructure while driving.

In an aspect of the present disclosure, the method further includes receiving user-eye data. The user-eye data includes information about a location of eyes of a user of the vehicle. The method further includes determining the location of the eyes of the user using the user-eye data and determining a location of the virtual image on the multi-focal plane augmented reality display based on the location of the eyes of the user. The step of transmitting the command signal to the multi-focal plane augmented reality display includes displaying the virtual image at the location on the multi-focal plane augmented reality display previously determined based on the location of the eyes of the user.

In an aspect of the present disclosure, the infrastructure may be a point-of-interest (POI) along the route of the vehicle. The infrastructure information may be information about the POI.

In an aspect of the present disclosure, the method further includes determining whether the POI is located along the route of the vehicle using the infrastructure data and, in response to determining that the POI is located along the route of the vehicle, displaying the virtual image on the multi-focal plane augmented reality display. The virtual image includes information about the POI located along the route of the vehicle.

In an aspect of the present disclosure, the method further includes determining a type of the virtual image to be displayed on the multi-focal plane augmented reality display using the infrastructure data. The infrastructure data includes information about a type of the POI.

In an aspect of the present disclosure, the method further includes determining a position of the vehicle relative to the location of the POI and determining a size of the virtual image on the multi-focal plane augmented reality display based on the position of the vehicle relative to the location of the POI.

In an aspect of the present disclosure, the method further includes determining whether the vehicle has passed the POI and, in response to determining that the vehicle has passed the POI, commanding the multi-focal plane augmented reality display to stop showing the virtual image.

In an aspect of the present disclosure, the infrastructure is a building. The building has an address. The address of the building has a building number. The method further includes displaying the virtual image on the multi-focal plane augmented reality display, wherein the virtual image includes the building number of the address.

In an aspect of the present disclosure, the infrastructure is a street. The street has a name. The method further includes displaying the virtual image on the multi-focal plane augmented reality display, wherein the virtual image includes the name of the street.

In an aspect of the present disclosure, the infrastructure is a street. The street has a rule. The method further includes displaying the virtual image on the multi-focal plane augmented reality display, wherein the virtual image is indicative of the rule of the street.

In an aspect of the present disclosure, a system for displaying infrastructure information in a vehicle includes a multi-focal plane augmented reality display, a plurality of sensors, and a controller in communication with the plurality of sensors and the multi-focal plane augmented reality display. The controller is configured to receive infrastructure data from at least one of the sensors. The infrastructure data includes information about a location of at least one infrastructure along a route of the vehicle. The controller is further configured to receive vehicle-location data from at least one of the sensors. The vehicle-location data includes information about a location of the vehicle. The controller is configured to determine a position of the vehicle relative to the location of the infrastructure using the infrastructure data and the vehicle-location data. Also, the controller is configured to transmit a command signal to the multi-focal plane augmented reality display to display a virtual image showing the infrastructure information of the at least one infrastructure on the multi-focal plane augmented reality display. The system described in this paragraph improves vehicle technology by providing infrastructure information to the vehicle user that helps the vehicle user easily locate and identify infrastructure while driving.

In an aspect of the present disclosure, the controller is configured to receive user-eye data from a user tracker. The user-eye data includes information about a location of eyes of a user of the vehicle. The controller is configured to determine the location of the eyes of the user using the user-eye data and determine a location of the virtual image on the multi-focal plane augmented reality display based on the location of the eyes of the user. Moreover, the controller is configured to command the multi-focal plane augmented reality display to display the virtual image at the location on the multi-focal plane augmented reality display previously determined based on the location of the eyes of the user.

In an aspect of the present disclosure, the infrastructure may be POI along the route of the vehicle. The infrastructure information is information about the POI.

In an aspect of the present disclosure, the controller is further configured to determine whether the at least one POI is located along the route of the vehicle using the infrastructure data and, in response to determining that the POI is located along the route of the vehicle, command the multi-focal plane augmented reality display to display the virtual image, wherein the virtual image includes information about the POI located along the route of the vehicle.

In an aspect of the present disclosure, the controller is further configured to determine a type of the virtual image to be displayed on the multi-focal plane augmented reality display using the infrastructure data, wherein the infrastructure data includes information about a type of the POI.

In an aspect of the present disclosure, the controller is configured to determine a position of the vehicle relative to the location of the POI and determine a size of the virtual image on the multi-focal plane augmented reality display based on the position of the vehicle relative to the location of the POI.

In an aspect of the present disclosure, the controller is further configured to determine whether the vehicle has passed the POI and, in response to determining that the vehicle has passed the POI, command the multi-focal plane augmented reality display to stop showing the virtual image.

In an aspect of the present disclosure, the infrastructure is a building. The building has an address. The address of the building has a building number. The controller is further configured to command the multi-focal plane augmented reality display to display the virtual image on the multi-focal plane augmented reality display, wherein the virtual image includes the building number of the address.

In an aspect of the present disclosure, the infrastructure is a street. The street has a name. The controller is further configured to command the multi-focal plane augmented reality display to display the virtual image on the multi-focal plane augmented reality display, wherein the virtual image includes the name of the street.

In an aspect of the present disclosure, the infrastructure is a street. The street has a rule. The controller is further configured to command the multi-focal plane augmented reality display to display the virtual image on the multi-focal plane augmented reality display, wherein the virtual image is indicative of the rule of the street.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Reference will now be made in detail to several examples of the disclosure that are illustrated in accompanying drawings. Whenever possible, the same or similar reference numerals are used in the drawings and the description to refer to the same or like parts or steps.

Figure 1:
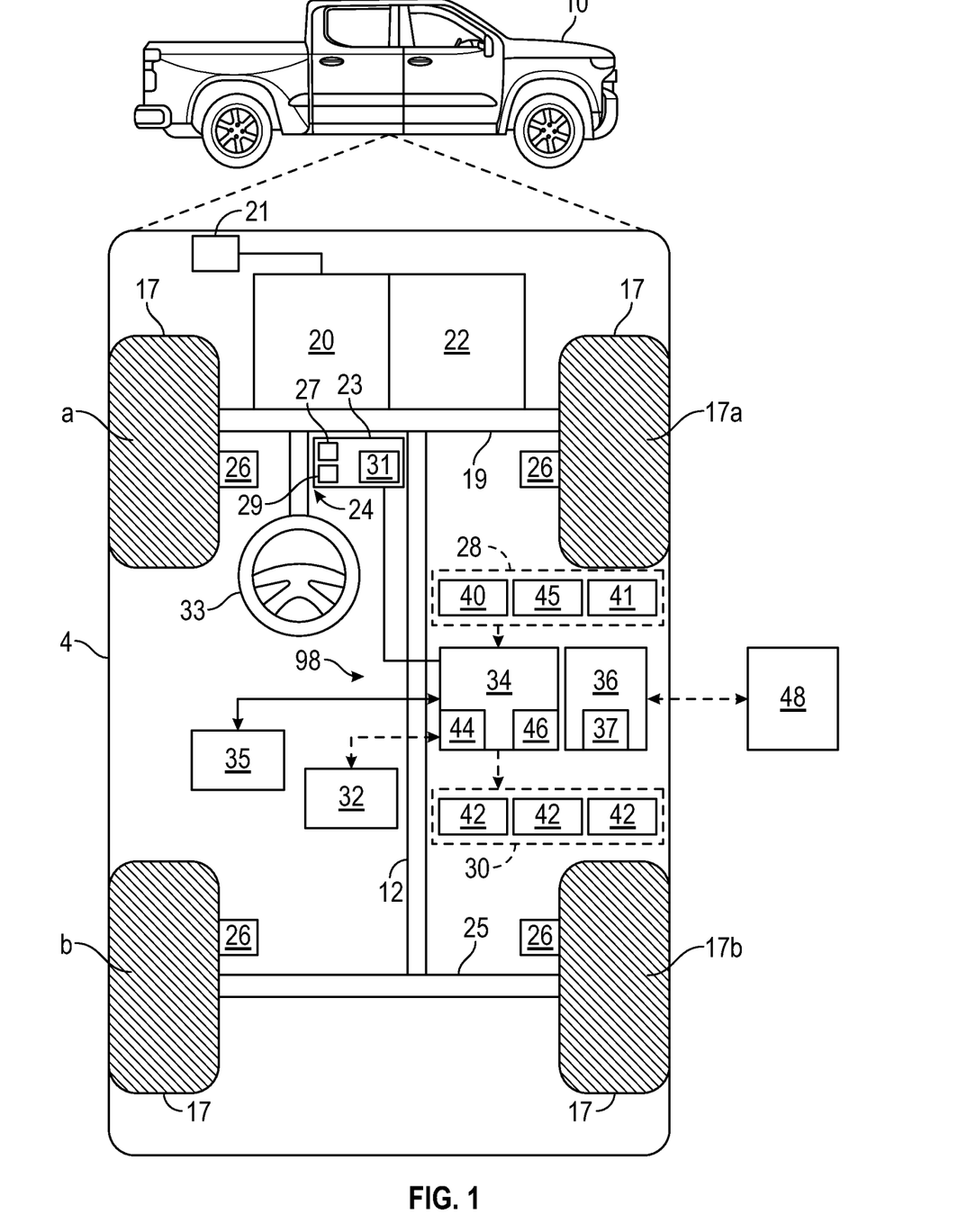
FIG. 1 is a block diagram depicting an embodiment of a vehicle including a system for displaying infrastructure information on a multi-focal plane augmented reality display.

With reference to FIG. 1, a vehicle 10 generally includes a chassis 12, a body 14, front and rear wheels 17 and may be referred to as a vehicle system. In the depicted embodiment, the vehicle 10 includes two front wheels 17*a* and two rear wheels 17*b*. The body 14 is arranged on the chassis 12 and substantially encloses components of the vehicle 10. The body 14 and the chassis 12 may jointly form a frame. The wheels 17 are each rotationally coupled to the chassis 12 near a respective corner of the body 14. The vehicle 10 includes a front axle 19 coupled to the front wheels 17*a* and a rear axle 25 coupled to the rear wheels 17*b*.

In various embodiments, the vehicle 10 may be an autonomous vehicle and a control system 98 is incorporated into the vehicle 10. The control system 98 may be referred to as the system or the system for displaying infrastructure information on a display 29. The vehicle 10 is, for example, a vehicle that is automatically controlled to carry passengers from one location to another. The vehicle 10 is depicted in the illustrated embodiment as a pickup truck, but it should be appreciated that other vehicles including, trucks, sedans, coupes, sport utility vehicles (SUVs), recreational vehicles (RVs), etc., may also be used. In an embodiment, the vehicle 10 may be a so-called a Level Two, a Level Three, Level Four, or Level Five automation system. A Level Four system indicates "high automation," referring to the driving mode-specific performance by an automated driving system of aspects of the dynamic driving task, even if a human driver does not respond appropriately to a request to intervene. A Level Five system indicates "full automation," referring to the full-time performance by an automated driving system of aspects of the dynamic driving task under a number of roadway and environmental conditions that can be managed by a human driver. In Level 3 vehicles, the vehicle systems perform the entire dynamic driving task (DDT) within the area that it is designed to do so. The vehicle operator is only expected to be responsible for the DDT-fallback when the vehicle 10 essentially "asks" the driver to take over if something goes wrong or the vehicle is about to leave the zone where it is able to operate. In Level 2 vehicles, systems provide steering, brake/acceleration support, lane centering, and adaptive cruise control. However, even if these systems are activated, the vehicle operator at the wheel must be driving and constantly supervising the automated features.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an electric machine such as a traction motor and/or a fuel cell propulsion system. The vehicle 10 may further include a battery (or battery pack) 21 electrically connected to the propulsion system 20. Accordingly, the battery 21 is configured to store electrical energy and to provide electrical energy to the propulsion system 20. In certain embodiments, the propulsion system 20 may include an internal combustion engine. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences a position of the vehicle wheels 17 and may include a steering wheel 33. While depicted as including a steering wheel 33 for illustrative purposes, in some embodiments contemplated within the scope of the present disclosure, the steering system 24 may not include a steering wheel 33.

The sensor system 28 includes one or more sensors 40 (i.e., sensing devices) that sense observable conditions of the exterior environment and/or the interior environment of the vehicle 10. The sensors 40 are in communication with the controller 34 and may include, but are not limited to, one or more radars, one or more light detection and ranging (lidar) sensors, one or more proximity sensors, one or more odometers, one or more ground penetrating radar (GPR) sensors, one or more steering angle sensors, one or more global positioning systems (GPS) transceivers 45, one or more tire pressure sensors, one or more cameras 41 (e.g., optical cameras and/or infrared cameras), one or more gyroscopes, one or more accelerometers, one or more inclinometers, one or more speed sensors, one or more ultrasonic sensors, one or more inertial measurement units (IMUs) and/or other sensors. Each sensor 40 is configured to generate a signal that is indicative of the sensed observable conditions of the exterior environment and/or the interior environment of the vehicle 10. Because the sensor system 28 provides data to the controller 34, the sensor system 28 and its sensors 40 are considered sources of information (or simply sources).

The sensor system 28 includes one or more Global Navigation Satellite System (GNSS) transceivers 45 (e.g., Global Positioning System (GPS) transceivers) configured to detect and monitor the route data (i.e., route information). The GNSS transceiver 45 is configured to communicate with a GNSS to locate the position of the vehicle 10 in the globe. The GNSS transceiver 45 is in electronic communication with the controller 34.

The actuator system 30 includes one or more actuator devices 42 that control one or more vehicle features such as, but not limited to, the propulsion system 20, the transmission system 22, the steering system 24, and the brake system 26. In various embodiments, the vehicle features may further include interior and/or exterior vehicle features such as, but are not limited to, doors, a trunk, and cabin features such as air, music, lighting, etc.

The data storage device 32 stores data for use in automatically controlling the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. The data storage device 32 may be part of the controller 34, separate from the controller 34, or part of the controller 34 and part of a separate system.

The vehicle 10 may further include one or more airbags 35 in communication with the controller 34 or another controller of the vehicle 10. The airbag 35 includes an inflatable bladder and is configured to transition between a stowed configuration and a deployed configuration to cushion the effects of an external force applied to the vehicle 10. The sensors 40 may include an airbag sensor, such as an IMU, configured to detect an external force and generate a signal indicative of the magnitude of such external force. The controller 34 is configured to command the airbag 35 to deploy based on the signal from one or more sensors 40, such as the airbag sensor. Accordingly, the controller 34 is configured to determine when the airbag 35 has been deployed.

The controller 34 includes at least one processor 44 and a non-transitory computer readable storage device or media 46. The processor 44 may be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10. The controller 34 of the vehicle 10 may be referred to as a vehicle controller and may programmed to execute a method 100 (FIG. 8) for displaying street information on the display 29 as described in detail below and/or a method 200 for displaying POI information on the display 29 as described in detail below.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although a single controller 34 is shown in FIG. 1, embodiments of the vehicle 10 may include a plurality of controllers 34 that communicate over a suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the control system 98. The vehicle 10 includes a user interface 23, which may be a touchscreen in the dashboard. The user interface 23 may include, but is not limited to, an alarm, such as one or more speakers 27 to provide an audible sound, haptic feedback in a vehicle seat or other object, one or more displays 29, one or more microphones 31 and/or other devices suitable to provide a notification to the vehicle user of the vehicle 10. The user interface 23 is in electronic communication with the controller 34 and is configured to receive inputs by a user (e.g., a vehicle operator or a vehicle passenger). For example, the user interface 23 may include a touch screen and/or buttons configured to receive inputs from a vehicle user. Accordingly, the controller 34 is configured to receive inputs from the user via the user interface 23.

The display 29 is configured to display information to the user (e.g., vehicle operator or passenger) and may be an augmented reality (AR) display. In the present disclosure, the term "AR display" means a display that presents information to users, while still allowing sight of the outside world. In certain embodiments, the display 29 may be configured as a head-up display (HUD), and/or an information cluster display. Accordingly, the display 29 may be an AR HUD or an AR information cluster display. In an AR HUD, images are projected on a windshield 39 (FIG. 6) of the vehicle 10. In an AR information cluster display, the information cluster panel of the vehicle 10 includes a screen that presents an image of the front of the vehicle 10 captured by one or more cameras 41 (i.e., a forward image) and virtual images presented on that forward image. As discussed below, the display 29 may be a multi-focal plane AR display to facilitate manipulation (e.g., size, location, and type) of the virtual images.

The communication system 36 is in communication with the controller 34 and is configured to wirelessly communicate information to and from other entities 48, such as but not limited to, other vehicles ("V2V" communication), infrastructure ("V2I" communication), remote systems at a remote call center (e.g., ON-STAR by GENERAL MOTORS) and/or personal devices. In certain embodiments, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or communication transceivers 37 for receiving and/or transmitting signals, such as cooperative sensing messages (CSMs). The communication transceivers 37 may be considered sensors 40. The communication system 36 is configured to wirelessly communicate information between the vehicle 10 and another vehicle. Further, the communication system 36 is configured to wirelessly communicate information between the vehicle 10 and infrastructure or other vehicles.

Figure 2:
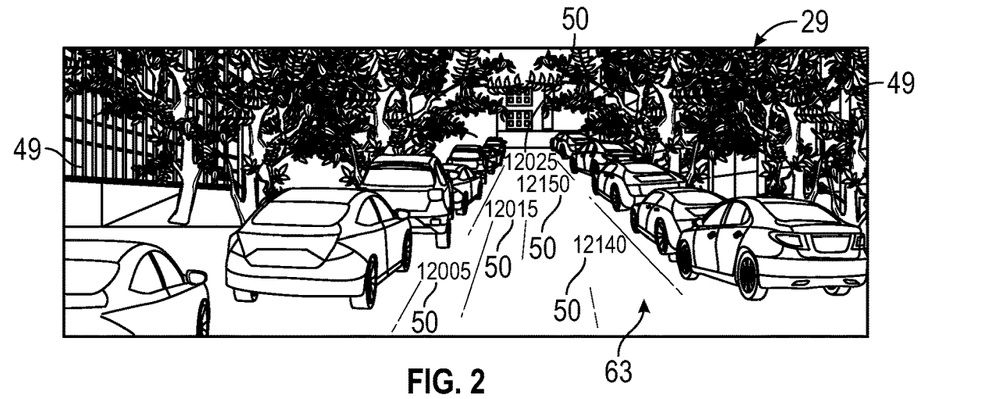
FIG. 2 is a schematic front view of the multi-focal plane augmented reality display of FIG. 1, wherein the multi-focal plane augmented reality display is configured as a head-up display (HUD) and shows street addresses.
Figure 3:
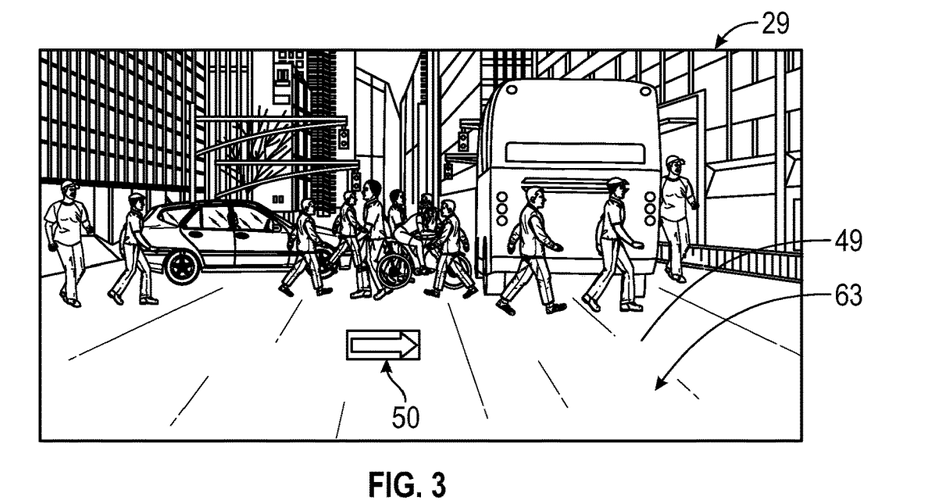
FIG. 3 is a schematic front view of the multi-focal plane augmented reality display of FIG. 1, wherein the multi-focal plane augmented reality display is configured as a HUD and shows a street name and a street rule.

With reference to FIGS. 1, 2, and 3, the system 98 is configured to command the display 29, such as an AR HUD or an AR information cluster display, to show infrastructure information (e.g., street addresses, street rule, and/or location of one or more POIs 47) using data received from the sensors 40 in the vehicle 10, data received from other entities 48 through the communication system 36, and/or eye-tracking data. In doing so, the display 29 shows the infrastructure information in a contextual manner by augmenting the road scene with conformal graphics. In the present disclosure, the term "conformal graphic" means syntenic generated content (i.e., a virtual image 50) presented as part of the outside world. Accordingly, the display 29 is a conformal display. In the present disclosure, the term "conformal display" means a display that has the ability to represent synthetically generated content (i.e., one or more virtual images 50) as part of the outside world.

In FIG. 2, the display 29 shows virtual images 50 with infrastructure information as part of the outside world. In the embodiment depicted in FIG. 2, the virtual images 50 display street addresses of infrastructure 49 along the route of the vehicle 10. Specifically, in FIG. 2, the virtual images 50 are house or building numbers of the address of the building and/or houses along the route of the vehicle 10. Because the display 29 may be an AR display, FIG. 2 shows a view of a roadway 63 through a windshield 39 (FIG. 7) in addition to the virtual images 50 or an image of the roadway 63 with the virtual images 50. In the present disclosure, the term "roadway" means an open way for vehicles 10. While FIG. 2 shows the virtual images 50 displaying the house or building numbers of an address that correspond to the houses or buildings along the route of the vehicle 10, it is contemplated that the virtual images 50 may include other type of infrastructure information as discussed below. In FIG. 2, the size of each virtual image 50 may be inversely proportional to the distance from the vehicle 10 to the infrastructure. Thus, the virtual image 50 corresponding to the infrastructure that is farther from the vehicle 10 is smaller than the virtual image 50 corresponding to the infrastructure that is closer to the vehicle 10.

In FIG. 3, the display 29 shows virtual images 50 with street information as part of the outside world. As a non-limiting example, in FIG. 3, the virtual images 50 provide the user with information about a street crossing the roadway 63 (i.e., a cross street) and rules for that cross street. For instance, the virtual image 50 may include the name of the cross street (e.g., 28$^{th}$ Street) and a symbol indicative of the rule for that cross street. Such symbol may be an arrow with text inside (e.g., one way) indicating that the cross street is a one-way street and that vehicles 10 are solely allowed to travel in the direction of the arrow. Regardless of the type of virtual image 50 used, the virtual image 50 is positioned at a location of the infrastructure relative to the vehicle 10. For example, the virtual image 50 indicating the name of the cross street and the rule for that cross street may be positioned on that particular cross street.

Figure 4:
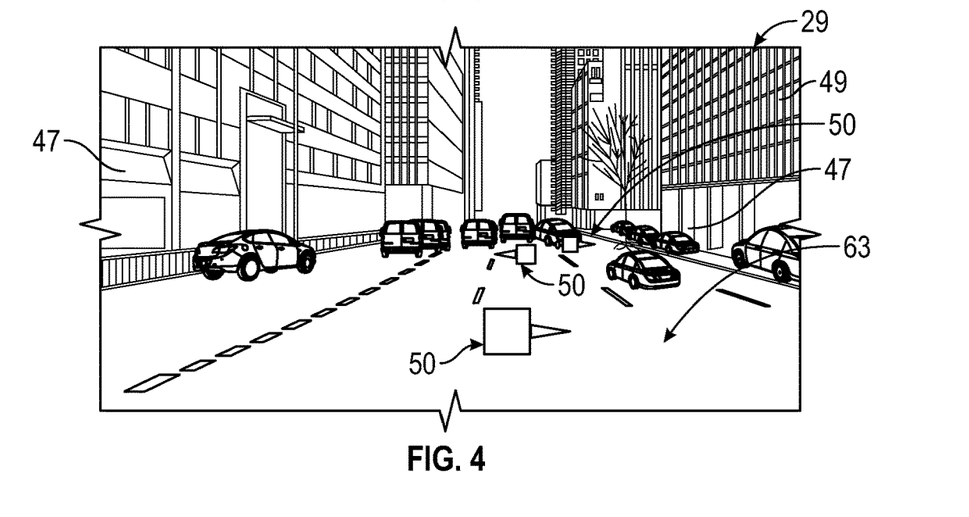
FIG. 4 is a schematic front view of the multi-focal plane augmented reality display of FIG. 1, wherein the multi-focal plane augmented reality display is configured as a HUD and shows the location of point-of-interests.

In FIG. 4, the display 29 shows virtual images 50 with POI information as part of the outside world. As a non-limiting example, in FIG. 4, the virtual images 50 include text or a graphical item (represented by a square) and an arrow. The graphical item may be a drawing, such as trademark, representing one or more POIs 47, and the arrow may indicate point to the location of the POI 47. As discussed below, the vehicle user may identify the types of POI 47 that he or she wishes to identify. For example, the vehicle user may select to solely identify coffee shops or gas stations. Then, the display 29 shows solely POIs 47 related to coffee shops or gas stations. The virtual images 50 are each positioned at the location of the relevant POIs 47 along the route of the vehicle 10. Thus, the virtual image 50 corresponding to the POI 47 that is farther from the vehicle 10 is smaller than the virtual image 50 corresponding to the POI 47 that is closer to the vehicle 10.

Figure 5:
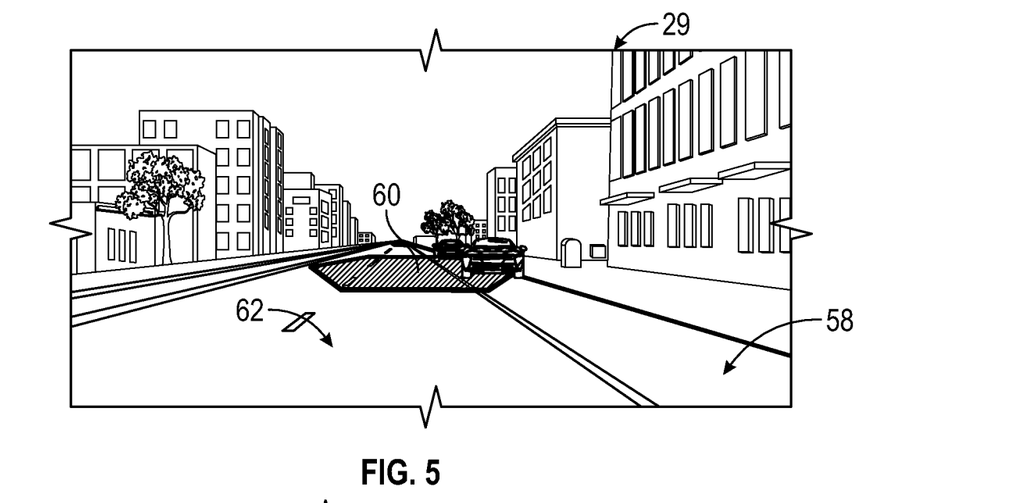
FIG. 5 is a schematic front view of the multi-focal plane augmented reality display of FIG. 1, highlighting a second image plane of the multi-focal plane augmented reality display of FIG. 1.
Figure 6:
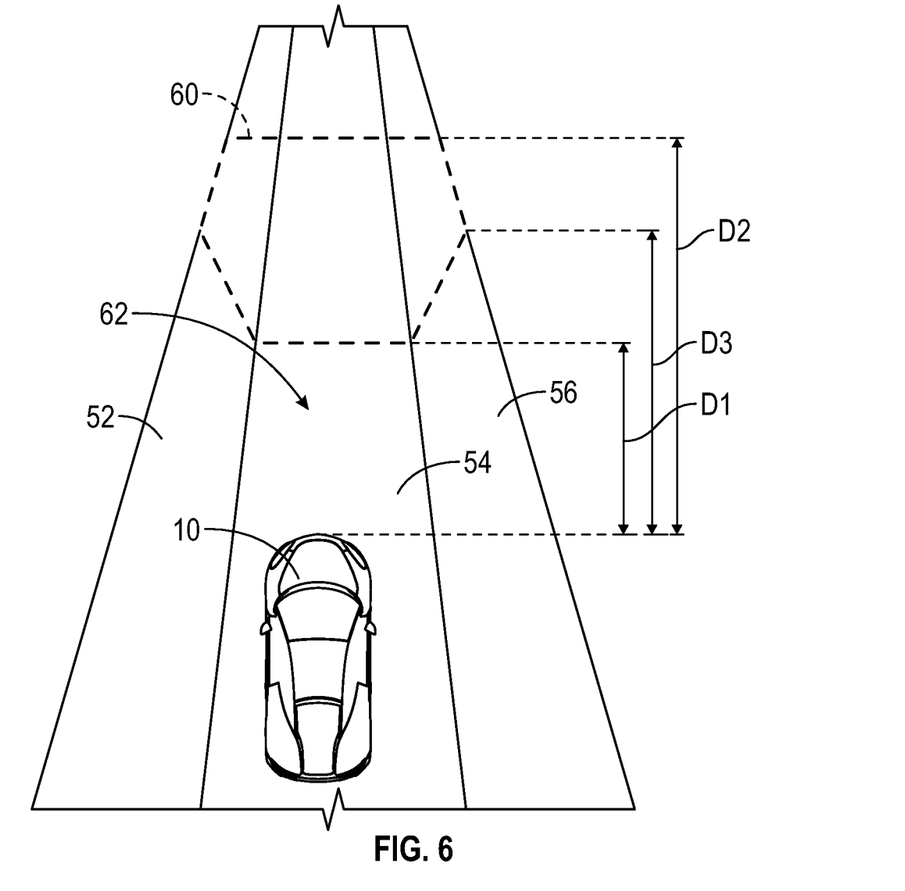
FIG. 6 is a schematic diagram of the second image plane of the multi-focal plane augmented reality display of FIG. 1.

With reference to FIGS. 5 and 6, the display 29 may be a multi-focal plane AR display as mentioned above. In this case, the display 29 has a first image plane 58 and a second image plane 60. The first image plane 58 shows the view of the outside world, and the second image plane 60 is reserved for displaying the virtual images 50 (FIG. 2). The second image plane 60 spans multiple lanes and the virtual images 50 appear at a location farther on the roadway surface 62 relative to the first image plane 58. For instance, as shown in FIG. 5, the second image plane 60 covers the left lane 52, the central lane 54, and the right lane 56. As a non-limiting example, in the central lane 54, the second image plane 60 starts at a first predetermined distance D1 (e.g., twenty-five meters) from the vehicle 10 and ends at a second predetermined distance D2 (e.g., ninety meters) from the vehicle 10. Regardless of the specific distances, the second predetermined distance D2 is greater than the first predetermined distance D1 to help the vehicle user see the virtual images 50 (FIG. 2). In the left lane 52 and the right lane 56, the second image plane 60 is delimited by a sloped boundary that starts at the first predetermined distance D1 from the vehicle 10 and ends at a third predetermined distance D3 (e.g., fifty meters) from the vehicle 10. The third predetermined distance D3 is greater than the first predetermined distance D1 and less than the second predetermined distance D2 to help the vehicle user see the virtual images 50 (FIG. 2). As used herein, the term "multi-focal plane AR display" means an AR display that presents images in more than one image plane, wherein the image planes are at different distances and locations. It is desirable to use a multi-focal plane AR display in the presently disclosed system 98 to easily change the size, type, and/or location of the virtual images 50 with respect to the view of the outside world.

Figure 7:
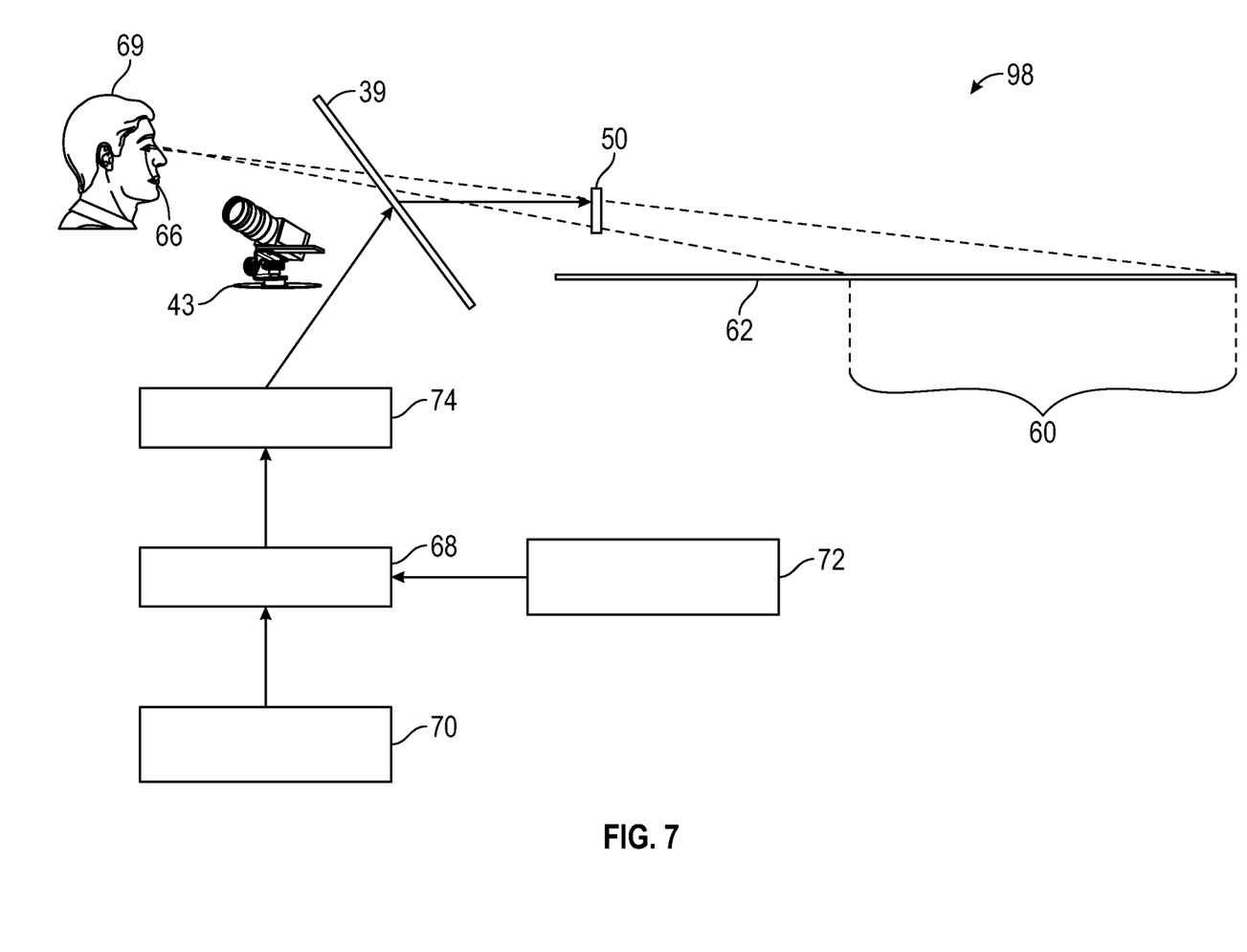
FIG. 7 is a schematic diagram of part of the system for displaying infrastructure information on the multi-focal plane augmented reality display of FIG. 1.

With reference to FIG. 7, the system 98 includes a user tracker 43 (e.g., eye tracker and/or head tracker) configured to track the position and movement of the eyes 66 or the head 69 of the vehicle user. In the depicted embodiment, the user tracker may be configured as one or more of cameras 41 of the vehicle 10. As discussed above, the cameras 41 are considered sensors 40 of the vehicle 10. As a sensor 40, the user tracker 43 is in communication with the controller 34, which includes a system manager 68. During operation of the system 98, the system manager 68 receives at least a first input 70 and a second input 72. The first input 70 is indicative of the position of the vehicle in space (i.e., the vehicle location in space), and the second input 72 is indicative of the vehicle user position in the vehicle 10 (e.g., the position of the eyes and/or head of the user in the vehicle 10). The first input 70 may include data such as GNSS data (e.g., GPS data), vehicle speed roadway curvature, and vehicle steering, and this data may be collected from the sensors 40 of the vehicle 10 and/or other entities 48 through the communication system 36 of the vehicle 10. The second input 72 may be received from the user tracker (e.g., eye tracker and/or head tracker). The system manager 68 is configured to determine (e.g., compute) the type, size, shape, and color of the conformal graphics (i.e., virtual images 50) based on the first input 70 (i.e., the vehicle location in space), the second input 72 (e.g., the position of the eyes and/or head of the user in the vehicle 10), and the sensed vehicle driving environment (which may be obtained through the sensors 40). The type, size, shape, and color of the conformal graphics of the virtual image 50 may be collectively referred to as the virtual image characteristics.

With continued reference to FIG. 7, the system 98 further includes an image engine 74, which is part of the display 29, and may be an integrated circuit configured to generate the virtual images 50. These generated virtual images 50 are then projected on the windshield 39 (if the display 29 is a HUD) to show the virtual images 50 on the second image plane 60 along the roadway surface 62.

Figure 8:
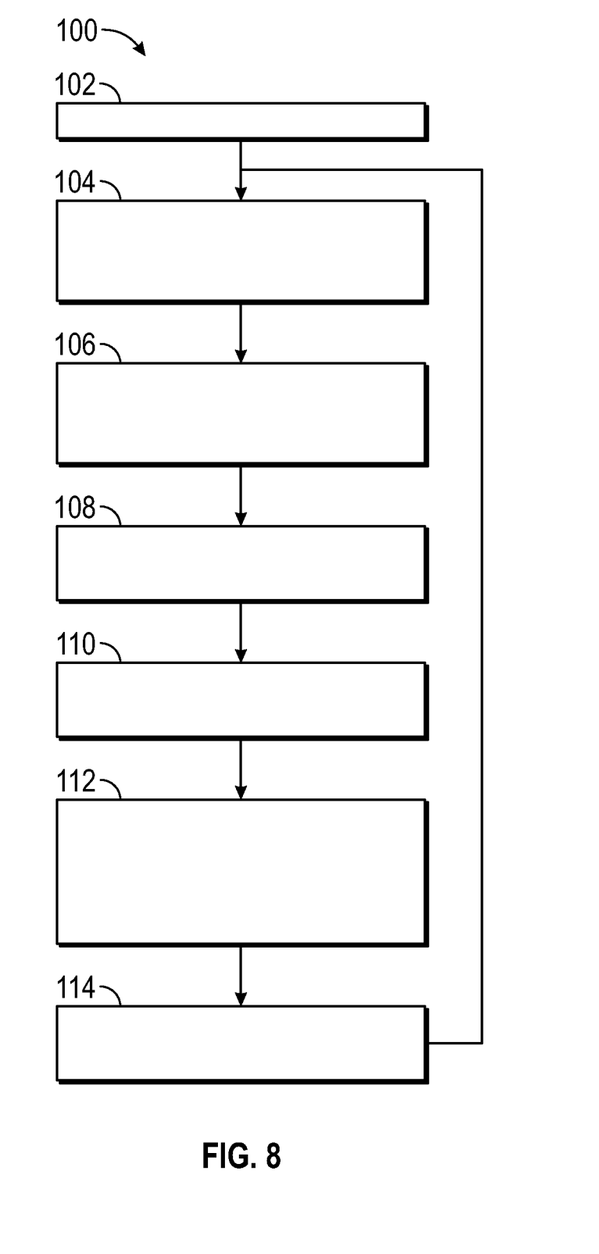
FIG. 8 is a flowchart of a method for providing street information on a multi-focal plane augmented reality display.

FIG. 8 is a flowchart of the method 100 for displaying infrastructure information (e.g., street address and/or rules) on the display 29 (e.g., an AR display). In the present disclosure, the term "infrastructure" means physical structures and facilities (e.g., buildings, roads, streets, power supplies) needed for the operation of a society or enterprise. Thus, the term "infrastructure information" means information about an infrastructure 49, such as street rules, street addresses, and/or the location of a POI 47. The method 100 begins at block 102, in which the controller 34 determines that the vehicle 10 is being driven using, for example, signals generated by the sensors 40. For example, the controller 34 may receive data from one of the sensors 40, such as a speed sensor, to determine that the vehicle 10 is moving. Then, the method 100 proceeds to block 104.

At block 104, the controller 34 determines the location of the vehicle 10 and the location of at least one infrastructure 49 (FIG. 2). To do so, the controller 34 may receive at least one signal from one or more sensors 40, such as cameras 41, GNSS transceivers 45 (e.g., Global Positioning System (GPS) transceivers), data from the internet, roadway databases and/or data from other vehicles 10 (i.e., V2X data). For example, the controller 34 may receive vehicle-location data and/or roadway data from the GNSS transceivers 45. In the present disclosure, the term "vehicle-location data" means data that indicates the location of the vehicle 10. As used herein, the term "roadway data" means data including information about a roadway 63 (FIG. 2) along the route of the vehicle 10 and may include one or more roadway databases and/or one or more roadway maps. At block 104, the controller 34 may also receive infrastructure data from one or more sensors 40, such as cameras 41, GNSS transceivers 45 (e.g., Global Positioning System (GPS) transceivers), data from the internet, roadway databases and/or data from other vehicles 10 (i.e., V2X data). In the present disclosure, the term "infrastructure data" includes data about at least one infrastructure 49 along the route of the vehicle 10 and may include information about at least one infrastructure along the route of the vehicle 10, such as name, location, address, type, and/or rules relating to an infrastructure 49 along the route of the vehicle 10. Accordingly, the controller 34 may determine the location of the vehicle 10 and infrastructure 49 along the route of the vehicle 10 using, for example, the vehicle-location data and infrastructure data received from the GNSS transceiver 45, another sensor 40, or another suitable source of information. The method 100 then proceeds to block 106.

At block 106, the controller 34 determines the vehicle position relative to a roadway map. In other words, the controller 34 determines the position of the vehicle 10 relative to the roadway 63. In doing so, the controller 34 may use the vehicle-location data received from GNSS transceiver 45 and/or roadway data, such as roadway databases. Stated differently, at block 110, the controller 34 determines where the vehicle 10 is located in the roadway 63. Then, the method 100 continues to block 108.

At block 108, the controller 34 determines the specific virtual images 50 to be displayed on the display 29 (e.g., the multi-focal plane augmented reality display) based on the infrastructure data, which was previously received by the controller 34. As discussed above, the virtual images 50 may be indicative of the name, address, location, and/or rules relating to at least one infrastructure 49 along the route of the vehicle 10. For example, as shown in FIG. 2, the controller 34 may select virtual images 50 that indicate the house or building numbers of the addresses of the infrastructure 49 along the route of the vehicle 10. Also, for instance, the controller 34 may select virtual images 50 that indicate street rules with arrows and/or street names. Further, the controller 34 may determine the size of the virtual images 50, in real time, based on how close or how far the infrastructure 49 is from the vehicle 10. For example, the size of the virtual images 50 may increase as the vehicle 10 gets closer to the road junction 65. Next, the method 100 proceeds to block 110.

At block 110, the controller 34 determines the location of the eyes 66 and/or the head 69 of the user of the vehicle 10 using at least one input from the user tracker 43. As discussed above, the user tracker 43 may be a camera 41 configured to track the movements of the head 69 and/or the eyes 66 of the vehicle user. The controller 34 then uses the inputs from the user tracker 43 to continuously determine, in real time, the location of the eyes 66 and/or the head 69 of the user of the vehicle 10. The method 100 then proceeds to block 112.

At block 112, the controller 34 determines, in real time, the location, type, size, shape, and color of the virtual images 50 (FIG. 2) to be displayed on the display 29 (e.g., the multi-focal plane augmented reality display) based on the location of the eyes 66 and/or the head 69 of the user of the vehicle 10 and the infrastructure information. As a non-limiting example, the location of the virtual images 50 in the display 29 may change as the user moves the head 69 and/or eyes 66. Further, the size of the virtual images 50 may increase as the vehicle 10 gets closer to the infrastructure 49. Next, the method 100 proceeds to block 114.

At block 114, the controller 34 transmits a command signal to command the display 29 to present the virtual images 50 at the previously determined locations. As discussed above, the virtual images 50 include the infrastructure information concerning infrastructure 49 (e.g., street and/or building) along the route of the vehicle 10. The location of the virtual images 50 may change in real time based on location of the eyes 66 and/or the head 69 of the vehicle user. In response to receiving the command signal from the controller 34, the display 29 shows the virtual images 50 at the previously determined locations. After block 114, the method 100 returns to block 102.

Figure 9:
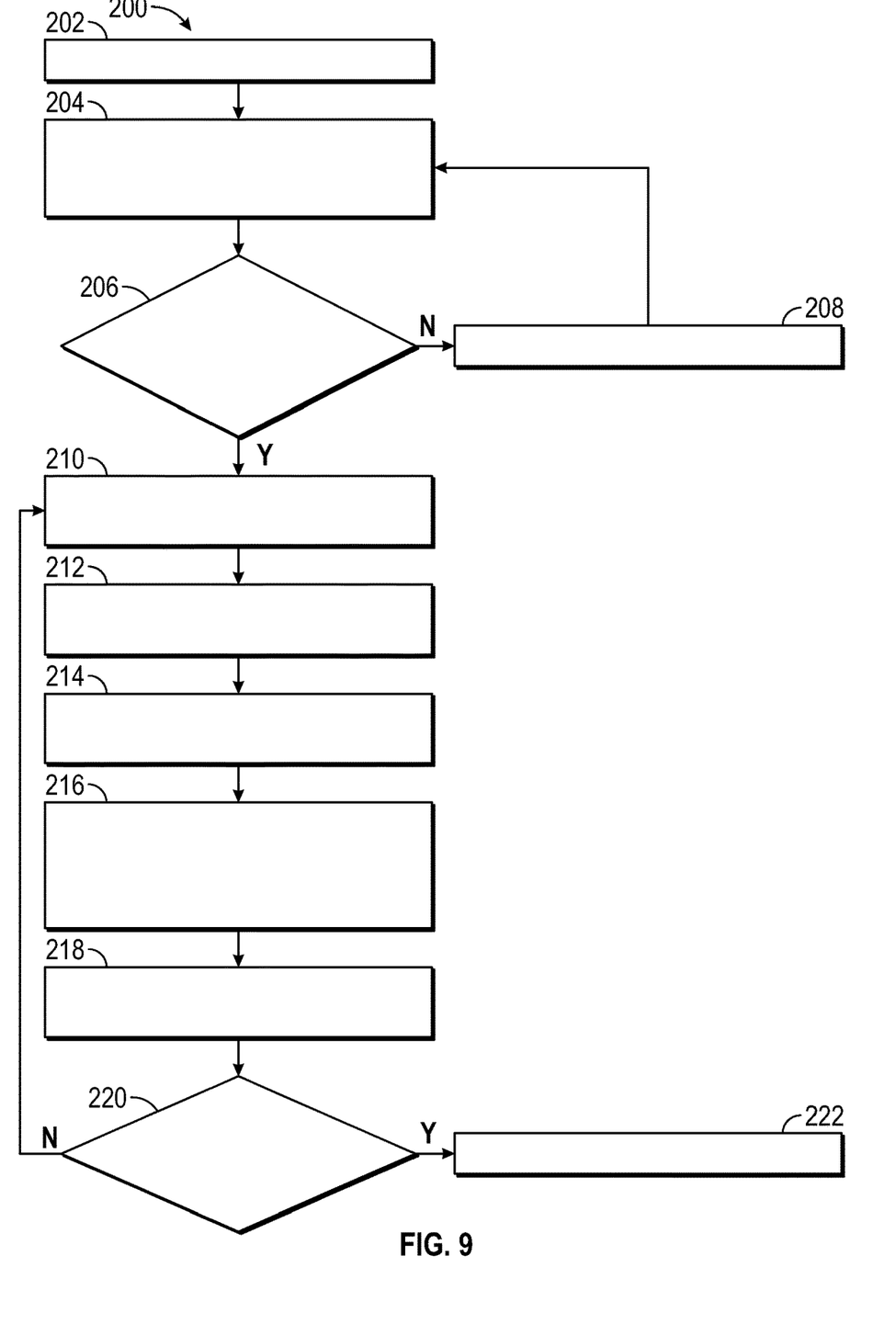
FIG. 9 is a flowchart of a method for providing POI information on a multi-focal plane augmented reality display.

FIG. 9 is a flowchart of the method 200 for displaying infrastructure information (e.g., information relating to POIs 47) on the display 29 (e.g., an AR display). As discussed above, the infrastructure information may include information about the POI 47 (e.g., the location of the POI 47) along the route of the vehicle 10. The method 200 begins at block 202, in which the controller 34 determines that the vehicle 10 is being driven using, for example, signals generated by the sensors 40. For example, the controller 34 may receive data from one of the sensors 40, such as a speed sensor, to determine that the vehicle 10 is moving. Then, the method 200 proceeds to block 204.

At block 204, the controller 34 determines the location of the vehicle 10 and the location of at least one infrastructure 49 (FIG. 2). To do so, the controller 34 may receive at least one signal from one or more sensors 40, such as cameras 41, GNSS transceivers 45 (e.g., Global Positioning System (GPS) transceivers), data from the internet, roadway databases and/or data from other vehicles 10 (i.e., V2X data). For example, the controller 34 may receive vehicle-location data and/or roadway data from one of the sensors 40, such as the GNSS transceivers 45. In the present disclosure, the term "vehicle-location data" means data that indicates the location of the vehicle 10. As used herein, the term "roadway data" means data including information about a roadway 63 (FIG. 2) along the route of the vehicle 10 and may include one or more roadway databases and/or one or more roadway maps. At block 104, the controller 34 may also receive infrastructure data from one or more sensors 40, such as cameras 41, GNSS transceivers 45 (e.g., Global Positioning System (GPS) transceivers), data from the internet, roadway databases and/or data from other vehicles 10 (i.e., V2X data). The term "infrastructure data" includes data about at least one POI 47 along the route of the vehicle 10, such as name, type, location, and/or address, and/or type of one or more POIs 47 along the route of the vehicle 10. Accordingly, the controller 34 may determine the location of the vehicle 10 and POIs 47 along the route of the vehicle 10 using, for example, the vehicle-location data and infrastructure data received from the GNSS transceiver 45, another sensor 40, or another suitable source of information. The method 200 then proceeds to block 206.

At block 206, the controller 34 determines whether one or more POIs 47 are upcoming along the route of the vehicle 10. To do so, the controller 34 may use the roadway data, the vehicle-location data, and/or the infrastructure data received from one or more sensors 40 or another source of information. If the vehicle 10 is not approaching at least one POI 47, then the method 200 continues to block 208. At block 208, no action is taken and the method 200 returns to block 204. If the vehicle 10 is approaching one or more POIs 47, then the method 200 proceeds to block 210.

At block 210, the controller 34 determines the vehicle position relative to one or more POIs 47 along the route of the vehicle 10. In other words, the controller 34 determines the position of the vehicle 10 relative to the POIs 47. In doing so, the controller 34 may use the vehicle-location data received from GNSS transceiver 45 and/or roadway data, such as roadway databases, and/or infrastructure data. Stated differently, at block 210, the controller 34 determines where the vehicle 10 is located relative to the POIs 47 along the route of the vehicle 10. Then, the method 200 continues to block 212.

At block 212, the controller 34 determines the specific virtual images 50 to be displayed on the display 29 (e.g., the multi-focal plane augmented reality display) based on the infrastructure data, which was previously received by the controller 34. In other words, the controller 34 determines the type of virtual images 50. As discussed above, the virtual images 50 may be indicative of the name, address, and/or location of the POIs 47 along the route of the vehicle 10. As a non-limiting example, in FIG. 4, the virtual images 50 include text or a graphical item (represented by a square) and an arrow. The graphical item may be a drawing, such as trademark, representing one or more POIs 47, and the arrow may indicate point to the location of the POI 47. As discussed below, the vehicle user may identify the types of POI that he or she wishes to identify. For example, the vehicle user may select to solely identify coffee shops or gas stations. Then, the display 29 shows solely POIs somehow related to coffee shops or gas stations. Next, the method 200 proceeds to block 214.

At block 214, the controller 34 determines the location of the eyes 66 and/or the head 69 of the user of the vehicle 10 using at least one input from the user tracker 43. As discussed above, the user tracker 43 may be a camera 41 configured to track the movements of the head 69 and/or the eyes 66 of the vehicle user. The controller 34 then uses the inputs from the user tracker 43 to continuously determine, in real time, the location of the eyes 66 and/or the head 69 of the user of the vehicle 10. The method 200 then proceeds to block 216.

At block 216, the controller 34 determines, in real time, the location, type, size, shape, and color of the virtual images 50 (FIG. 2) to be displayed on the display 29 (e.g., the multi-focal plane augmented reality display) based on the location of the eyes 66 and/or the head 69 of the user of the vehicle 10 and the infrastructure information. As a non-limiting example, the location of the virtual images 50 in the display 29 may change as the user moves the head 69 and/or eyes 66. Next, the method 300 proceeds to block 218.

At block 218, the controller 34 transmits a command signal to command the display 29 to present the virtual images 50 at the previously determined locations. In response to receiving the command signal from the controller 34, the display 29 presents the virtual images 50 at the previously determined locations. As discussed above, the virtual images 50 include the infrastructure information concerning the POIs 47 (e.g., trademark and location) along the route of the vehicle 10. The location of the virtual images 50 may change in real time based on location of the eyes 66 and/or the head 69 of the vehicle user. After block 218, the method 100 proceeds to block 220.

At block 220, the controller 34 determines whether the vehicle 10 has passed at least one POI 47. To do so, the controller 34 uses the location of the vehicle 10, which may be obtained from the GNSS transceivers 45 (e.g., Global Positioning System (GPS) transceivers), the roadway databases, and/or infrastructure data. If the vehicle 10 has not passed at least one POI 47, then the method 200 returns to block 210. If the vehicle 10 has passed at least one POI 47, then the method 200 continues to block 222.

At block 222, the controller 34 commands the display 29 to stop presenting the virtual image 50 corresponding to the POI 47 that the vehicle 10.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for displaying infrastructure information on a multi-focal plane augmented reality display of a vehicle, comprising:
   receiving infrastructure data, wherein the infrastructure data includes information about a location of at least one infrastructure along a route of the vehicle and the at least one infrastructure is at least one point-of-interest (POI) along the route of the vehicle;
   receiving vehicle-location data, wherein the vehicle-location data includes information about a location of the vehicle;
   determining a position of the vehicle relative to the location of the least one infrastructure using the infrastructure data and the vehicle-location data;
      determining a size of a virtual image based on a distance from the vehicle to the at least one infrastructure along the route of the vehicle, wherein the size of the virtual image is inversely proportional to the distance from the vehicle to the at least one infrastructure;
   receiving a selection from a user, wherein the selection is indicative of a type of the at least one POI that the user wants identified on the multi-focal plane augmented reality display, the multi-focal plane augmented reality display shows solely the virtual image associated with the type of the at least one POIs selected by the user, the infrastructure information is information about the POI, the virtual image includes a graphical item, and the graphical item is a trademark identifying the POI;
   determining whether the at least one POI is located along the route of the vehicle using the infrastructure data; and
   in response to determining that the at least one POI is located along the route of the vehicle, displaying the virtual image on the multi-focal plane augmented reality display, wherein the virtual image includes information about the at least one POI located along the route of the vehicle;
   transmitting a command signal to the multi-focal plane augmented reality display to display the virtual image showing the infrastructure information of the at least one infrastructure on the multi-focal plane augmented reality display; and
   wherein the multi-focal plane augmented reality display has a first image plane and a second image plane, the first image plane and the second image planes are at different locations, the first image plane shows a view of an outside world, a second image plane is reserved for displaying the virtual image, and the second image plane appears at a location farther on a roadway surface relative to the first image plane while the vehicle travels along the roadway surface, the second image plane starts at a first predetermined distance from the vehicle and ends at a second predetermined distance, the second predetermined distance is greater than the first predetermined distance, the second image plane includes a first linear boundary arranged horizontally relative to the roadway surface, the first linear boundary is at the first predetermined distance from the vehicle, the second image plane is delimited by a sloped linear boundary that starts at the first predetermined distance from the vehicle and ends at a third predetermined distance from the vehicle, the sloped linear boundary is obliquely angled relative to the first linear boundary, the third predetermined distance is greater than the first predetermined distance, the third predetermined distance is less than the second predetermined distance, and the second image plane includes a second linear boundary that is arranged parallel to the roadway surface, the slopped linear boundary is obliquely angled relative to the second linear boundary, and the second linear boundary starts at the third predetermined distance from the vehicle and ends at the second predetermined distance from the vehicle.

2. The method of claim 1, further comprising:
   receiving user-eye data, wherein the user-eye data includes information about a location of eyes of a user of the vehicle;
   determining the location of the eyes of the user using the user-eye data; and
   determining a location of the virtual image on the multi-focal plane augmented reality display based on the location of the eyes of the user;
   wherein transmitting the command signal to the multi-focal plane augmented reality display to display the virtual image showing the location of the at least one infrastructure on the multi-focal plane augmented reality display includes displaying the virtual image at the location on the multi-focal plane augmented reality display previously determined.

3. The method of claim 1, further comprising:
   determining whether the vehicle has passed the at least one POI; and
   in response to determining that the vehicle has passed the at least one POI, commanding the multi-focal plane augmented reality display to stop showing the virtual image.

4. The method of claim 1, wherein the infrastructure is a building, the building has an address, the address of the building has a building number, the method further includes displaying the virtual image on the multi-focal plane augmented reality display, and the virtual image includes the building number of the address.

5. The method of claim 1, wherein the infrastructure is a cross street, the cross street has a name, the method further includes displaying the virtual image on the multi-focal plane augmented reality display, and the virtual image includes the name of the cross street.

6. The method of claim 5, wherein the infrastructure is the cross street, the cross street has a rule, the method further includes displaying the virtual image on the multi-focal plane augmented reality display, and the virtual image is indicative of the rule of the cross street, the virtual image is an arrow with text inside indicating that the cross street is a one-way street.

7. A system for displaying infrastructure information in a vehicle, comprising:
a multi-focal plane augmented reality display;
a plurality of sensors;
a controller in communication with the plurality of sensors and the multi-focal plane augmented reality display, wherein the controller is configured to:
receive infrastructure data from at least one of the plurality of sensors, wherein the infrastructure data includes information about a location of at least one infrastructure along a route of the vehicle;
receive vehicle-location data from at last one of the plurality of sensors, wherein the vehicle-location data includes information about a location of the vehicle;
determine a position of the vehicle relative to the location of the least one infrastructure using the infrastructure data and the vehicle-location data;
determine a size of a virtual image based on a distance from the vehicle to the at least one infrastructure along the route of the vehicle, wherein the size of the virtual image is inversely proportional to the distance from the vehicle to the at least one infrastructure; and
transmit a command signal to the multi-focal plane augmented reality display to display the virtual image showing the infrastructure information of the at least one infrastructure on the multi-focal plane augmented reality display;
wherein the at least one infrastructure is at least one point-of-interest (POI) along the route of the vehicle, and the infrastructure information is information about the POI;
wherein the controller is further configured to:
determine whether the at least one POI is located along the route of the vehicle using the infrastructure data; and
in response to determining that the at least one POI is located along the route of the vehicle, command the multi-focal plane augmented reality display to display the virtual image;
wherein the virtual image includes information about the POI located along the route of the vehicle;
wherein the controller is configured to receive a selection from a user, wherein the selection is indicative of a type of the at least one POI that the user wants identified on the multi-focal plane augmented reality display, the multi-focal plane augmented reality display shows solely the virtual image associated with the type of the at least one POI selected by the user, and the type of the at least one POI is coffee shop; and
wherein the multi-focal plane augmented reality display has a first image plane and a second image plane, the first image plane and the second image planes are at different locations, the first image plane shows a view of an outside world, a second image plane is reserved for displaying the virtual image, and the second image plane appears at a location farther on a roadway surface relative to the first image plane while the vehicle travels along the roadway surface, the second image plane starts at a first predetermined distance from the vehicle and ends at a second predetermined distance, the second predetermined distance is greater than the first predetermined distance, the second image plane includes a first linear boundary arranged horizontally relative to the roadway surface, the first linear boundary is at the first predetermined distance from the vehicle, the second image plane is delimited by a sloped linear boundary that starts at the first predetermined distance from the vehicle and ends at a third predetermined distance from the vehicle, the sloped linear boundary is obliquely angled relative to the first linear boundary, the third predetermined distance is greater than the first predetermined distance, the third predetermined distance is less than the second predetermined distance, and the second image plane includes a second linear boundary that is arranged parallel to the roadway surface, the slopped linear boundary is obliquely angled relative to the second linear boundary, and the second linear boundary starts at the third predetermined distance from the vehicle and ends at the second predetermined distance from the vehicle, the first predetermined distance is twenty-five meters, the second predetermined distance is ninety meters, and the third predetermined distance is fifty meters.

8. The system of claim 7, wherein the controller is configured to:
receive user-eye data from a user tracker, wherein the user-eye data includes information about a location of eyes of a user of the vehicle;
continuously determine, in real-time, the location of the eyes of the user using the user-eye data;
determine, in real-time, a location of the virtual image on the multi-focal plane augmented reality display based on the location of the eyes of the user;
command the multi-focal plane augmented reality display to display the virtual image at the location on the multi-focal plane augmented reality display previously determined.

9. The system of claim 7, wherein the controller is further configured to:
determine whether the vehicle has passed the at least one POI; and
in response to determining that the vehicle has passed the at least one POI, command the multi-focal plane augmented reality display to stop showing the virtual image.

10. The system of claim 7, wherein the infrastructure is a building, the building has an address, the address of the building has a building number, the controller is further configured to command the multi-focal plane augmented reality display to display the virtual image on the multi-focal plane augmented reality display, and the virtual image includes the building number of the address.

11. The system of claim 7, wherein the infrastructure is a street, the street has a name, the controller is further configured to command the multi-focal plane augmented reality display to display the virtual image on the multi-focal plane augmented reality display, and the virtual image includes the name of the street.

12. The system of claim 7, wherein the infrastructure is a street, the street has a rule, the controller is further configured to command the multi-focal plane augmented reality display to display the virtual image on the multi-focal plane augmented reality display, and the virtual image is indicative of the rule of the street.

* * * * *